US012695305B2

(12) United States Patent
Permuy et al.

(10) Patent No.: US 12,695,305 B2
(45) Date of Patent: Jul. 28, 2026

(54) POWER SUPPLY SYSTEM FOR ARC FURNACE AND ASSOCIATED ARC FURNACE AND METHOD

(71) Applicant: GE ENERGY POWER CONVERSION TECHNOLOGY LIMITED, Warwicksire (GB)

(72) Inventors: Alfred Permuy, Villebon-sur-Yvette (FR); Cyrille Baviere, Villebon-sur-yvette (FR)

(73) Assignee: GE ENERGY POWER CONVERSION TECHNOLOGY LIMITED, Warwicksire (GB)

( * ) Notice: Subject to any disclaimer, the term of this patent is extended or adjusted under 35 U.S.C. 154(b) by 220 days.

(21) Appl. No.: 18/433,861

(22) Filed: Feb. 6, 2024

(65) Prior Publication Data
US 2024/0305202 A1     Sep. 12, 2024

(30) Foreign Application Priority Data

Mar. 2, 2023     (EP) ..................................... 23305271

(51) Int. Cl.
*H02J 3/00*     (2026.01)
*H02J 3/1842*     (2026.01)
(Continued)

(52) U.S. Cl.
CPC ............ *H02J 3/002* (2020.01); *H02J 3/1842* (2013.01); *H02J 3/1857* (2013.01); *H02M 5/4585* (2013.01); *H02M 7/483* (2013.01)

(58) Field of Classification Search
CPC ........ H02J 3/002; H02J 3/1842; H02J 3/1857; H02M 5/4585; H02M 7/483; H05B 7/105;
(Continued)

(56) References Cited

U.S. PATENT DOCUMENTS 8,933,378 B2     1/2015   Horger et al.
9,515,568 B2     12/2016  Zhang et al.
(Continued)

FOREIGN PATENT DOCUMENTS

DE     102018218439 A1 *   5/2019   .............. H02J 3/002
EP     2329684 B1     8/2012
(Continued)

OTHER PUBLICATIONS

Extended European Search Report for EP Application No. 23305271.1 dated Aug. 10, 2023, 5 pages.

*Primary Examiner* — Crystal L Hammond
*Assistant Examiner* — Jennifer C Caulk
(74) *Attorney, Agent, or Firm* — Wood IP LLC; Theodore A. Wood

(57)          ABSTRACT

A power supply system for arc furnace is described. The power supply system includes a power converter and a polyphase transformer. The power supply system further includes first disconnecting means connecting the input of the power converter to the primary circuit, second disconnecting means connecting the output of the power converter to the primary circuit, and the power supply system further includes a control circuit configured to control the power converter to supply the electrode and to stabilize the courant and the voltage delivered by the grid to reduce reactions in the grid when the first disconnecting means are open and the second disconnecting means are closed, and to control the power converter to stabilize the courant and the voltage delivered by the grid to reduce reactions in the grid when the first disconnecting means are closed and the second disconnecting means are open.

13 Claims, 10 Drawing Sheets

(51) Int. Cl.
    *H02J 3/1857*     (2026.01)
    *H02M 5/458*     (2006.01)
    *H02M 7/483*     (2007.01)

(58) Field of Classification Search
    CPC .......... H05B 7/107; H05B 7/109; H05B 7/11;
                         H05B 7/144; H05B 7/148
    See application file for complete search history.

(56)             References Cited

U.S. PATENT DOCUMENTS

| | | | |
|---|---|---|---|
| 2008/0123714 A1* | 5/2008 | Konig ..................... | H05B 7/005 |
| | | | 373/104 |
| 2011/0176575 A1* | 7/2011 | Horger ................... | H05B 7/144 |
| | | | 373/104 |
| 2019/0254128 A1* | 8/2019 | Dittmer ................... | H05B 7/18 |
| 2022/0352828 A1* | 11/2022 | Steimer ............... | H02M 5/2573 |

FOREIGN PATENT DOCUMENTS

| | | | | |
|---|---|---|---|---|
| EP | 2713495 A2 | 4/2014 | | |
| EP | 4110015 A1 * | 12/2022 | ............. | F27D 19/00 |

* cited by examiner

POWER SUPPLY SYSTEM FOR ARC FURNACE AND ASSOCIATED ARC FURNACE AND METHOD

CROSS-REFERENCE TO RELATED APPLICATIONS

This application claims priority to European Patent Application Serial Number EP23305271.1, filed Mar. 2, 2023, which is herein incorporated by reference.

TECHNICAL FIELD

The present invention concerns arc furnaces, and more particularly a power supply system for arc furnaces, and an arc furnace facility comprising an arc furnace and such a power supply system.

BACKGROUND

Arc furnaces are highly nonlinear loads resulting in considerable reactions on the power supply system, in particular so-called flicker.

The document EP 2 329 684 discloses a power supply system to supply a polyphase arc furnace from a grid.

The power supply system comprises an indirect power converter and a polyphase transformer.

The indirect power converter supplies a primary circuit of the transformer. A secondary circuit of the transformer supplies electrodes of the arc furnace.

The indirect power converter is controlled to minimize reactions on the grid in order to suppress the flicker and in order to comply with grid quality standards.

During the tuning of the power supply system or when the indirect power converter goes wrong, the power supply system may be stop, for example following reactions on the grid generated by the indirect power converter greater than acceptable reactions.

During these more or less log stops, the arc furnace does not melt scraps to produce molten steel.

Machines using molten steel, for example rolling mills, are forced to be stopped during stops of the arc furnace generated production losses.

It is therefore proposed to remedy the disadvantages related to arc furnace power supply systems known from the prior art.

SUMMARY

In view of the foregoing the invention proposes a power supply system for arc furnace including:

a power converter comprising an input intended to be connected to a polyphase supply grid and an output, and a polyphase transformer comprising a primary circuit and a secondary circuit intended to be connected to at least one electrode of the arc furnace.

The power supply system further comprises first disconnecting means connecting the input of the power converter to the primary circuit, second disconnecting means connecting the output of the power converter to the primary circuit, and the power supply system further comprises a control circuit configured:

to control the power converter to supply the electrode and to stabilize the current and the voltage delivered by the grid to reduce reactions in the grid when the first disconnecting means are open and the second disconnecting means are closed, and to control the power converter to stabilize the current and the voltage delivered by the grid to reduce reactions in the grid when the first disconnecting means are closed and the second disconnecting means are open.

Preferably, the first disconnecting means further connect the input of the power converter to the output of the power converter, the control circuit being further configured to control the power converter to supply the grid with power when the first disconnecting means are closed.

Advantageously, the control circuit is further configured to close the first disconnecting means and to open the second disconnecting means.

Preferably, the power converter comprises an input device, a link circuit comprising a first bus and a second bus, and an output device, wherein:

the input device comprises a plurality of input modules, each input module being connected to the first bus and the second bus and being intended to be connected to a different phase of the supply grid to supply the link circuit with a continuous voltage from the said phase of the supply grid, the output device comprises a plurality of output modules, each output module being connected to the first bus and second bus and to the primary circuit to supply the transformer with an alternative voltage from the circuit link, each input module comprising:

a leg including:

a first string connected to the first and second bus and comprising a plurality of switches connected in series, a first connecting node situated between two switches, a second connecting node situated between two switches and a third connecting nodes situated between two switches, and a second string comprising:

a first mid-connecting node, a plurality of switching units connected in series and extending between the first and second connecting points, the first mid-connecting node being between two switching units so that the number of switching units between the first connecting point and the first mid-connecting node is equal to the number of switching units between the second connecting point and the first mid-connecting node, the first mid-connecting node being intended to be connected to the said phase of the supply grid, the third connecting node of each input module being connected together, the control circuit being configured to control the switches, the switching units, and the output modules.

Advantageously, the leg further comprises two compensating modules, each compensating module comprising a first end and a plurality of switching units connected in series, the switching units of the first compensating module extending between the first connecting node and the first end of the first compensating unit, the switching units of the second compensating module extending between the second connecting node and the first end of the second compensating module, the first ends of the first and second compensating units being connected together, the control circuit being further configured to control the switching units of the compensating modules.

Preferably, the power converter comprises an input device, a link circuit comprising a first bus and a second bus, and an output device, wherein:

the input device comprises a plurality of input modules, each input module being connected to the first bus and the second bus and being intended to be connected to a different phase of the supply grid to supply the link circuit with a continuous voltage from the said phase of the supply grid, the output device is connected to the first bus and second bus and to the primary circuit to supply the transformer with an alternative voltage from the circuit link, each input module comprises a third string comprising:

a second mid-connecting node, and a plurality of switching units connected in series and extending between the first and second bus, the second mid-connecting node being between two second switching units so that the number of second switching units between the first bus and the second mid-connecting node is equal to the number of switching units between the second bus and the second mid-connecting node, the second mid-connecting node being connected to a phase of the primary circuit.

Advantageously, each output module comprises:

a second leg comprising:

a fourth string connected to the first and second bus and comprising a plurality of second switches connected in series and a fourth connecting node situated between two second switches, a fifth connecting node situated between two second switches, and a sixth connecting node situated between two second switches, and a fifth string comprising:

a third mid-connecting node, a plurality of second switching units connected in series and extending between the fourth and the fifth connecting nodes, the third mid-connecting node being between two switching units so that the number of switching units between the first connecting point and the third mid-connecting node is equal to the number of switching units between the second connecting point and the third mid-connecting node, the third mid-connecting node being connected to a phase of the primary circuit, the sixth connecting node of each output module being connected together, the control circuit being further configured to control the second switches and the second switching units.

Preferably, each output module comprises a sixth string comprising:

a fourth mid-connecting node, and a plurality of second switching units connected in series and extending between the first and second bus, the fourth mid-connecting node being between two second switching units so that the number of second switching units between the first bus and the fourth mid-connecting node is equal to the number of switching units between the second bus and the fourth mid-connecting node, the fourth mid-connecting node being connected to a phase of the primary circuit.

Another object of the invention relates to an arc furnace facility.

The arc furnace facility comprises an arc furnace including at least one electrode and a power supply system as defined above, wherein the electrode is connected to at least one phase of the secondary circuit of the polyphase transformer.

Advantageously, the arc furnace comprises a plurality of electrodes, each electrode being connected to a different phase of the secondary circuit.

Preferably, the power supply system further comprises a rectifier connected to the electrode and to each phase of the secondary circuit to supply the electrode with a continuous voltage from the secondary circuit.

Another object of the invention relates to a method for controlling a power supply system of an arc furnace, the power supply system including:

a power converter comprising an input connected to a polyphase supply grid and an output, and a polyphase transformer comprising a primary circuit and a secondary circuit connected to at least one electrode of the arc furnace.

The method comprises:

controlling the power converter to supply the electrode and to stabilize the current and the voltage delivered by the grid to reduce reactions in the grid when first disconnecting means are open and second disconnecting means are closed, and controlling the power converter to stabilize the current and the voltage delivered by the grid to reduce reactions in the grid when the first disconnecting means are closed and the second disconnecting means are open, the first disconnecting means connecting the input of the power converter to the primary circuit and the second disconnecting means connecting the output of the power converter to the primary circuit.

Preferably, the first disconnecting means further connect the input of the power converter to the output of the power converter, the method further comprising controlling the power converter to supply the grid with power when the first disconnecting means are closed.

BRIEF DESCRIPTION OF THE DRAWINGS

Other characteristics and advantages of the invention will emerge on reading the following description of embodiments of the invention, provided solely by way of non-limiting examples and with reference to the drawings in which.

DETAILED DESCRIPTION

Figure 1:
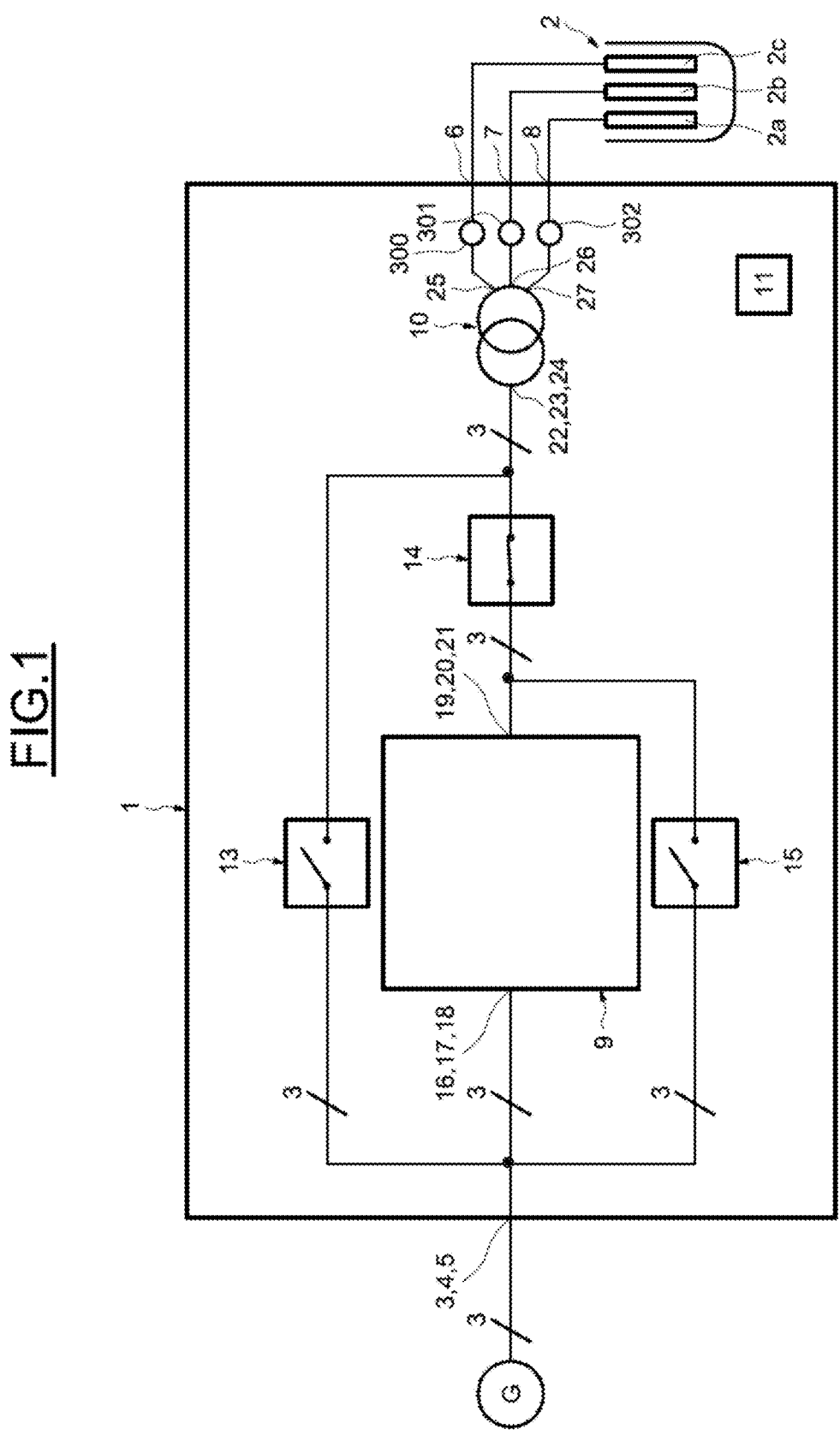
FIG. 1 illustrates schematically a first example of an arc furnace facility according to the invention.

Specifically, FIG. 1 illustrates a first example of an arc furnace facility.

The arc furnace facility comprises a polyphase power supply system 1 connected to a grid G and an arc furnace 2 connected to the power supply system 1.

The power supply system 1 supplies the arc furnace 2 form electrical energy supplied by the grid G.

It is assumed that the power supply system 1 and the polyphase arc furnace 2 have each three phases, the grid G been a three phases supply grid.

Each of the power supply system 1 and the polyphase arc furnace 2 may have two phases or more than three phases, the grid G having the same number of phases than the power supply system 1.

The arc furnace 2 comprises a set of electrodes comprising three electrodes 2a, 2b, 2c.

The electrodes 2a, 2b, 2c supplied by the power supply system 1 generate electric arcs between the electrodes 2a, 2b, 2c to melt the contents of the arc furnace 2, for example scrap.

The power supply system 1 comprises three inputs 3, 4, 5, each input being connected to a different phase of the grid G, and three outputs 6, 7, 8.

Each output 6, 7, 8 is connected to an electrode 2a, 2b, 2c.

The power supply system 1 further comprises a power converter 9, a transformer 10, a control circuit 11, current sensors, and voltage sensors.

The control circuit 11 may comprise a processing unit.

The power supply system 1 comprises first disconnecting means comprising a first disconnector 13 and a third disconnector 15, and second disconnecting means comprising a second disconnector 14.

The first disconnecting means and the second disconnecting means are controlled by the control circuit 11.

The power converter 9 comprises three inputs 16, 17, 18 and three outputs 19, 20, 21.

Each input 16, 17, 18 of the power converter 9 is connected to a different input 3, 4, 5 of the power supply system 1.

The transformer 10 further comprises a primary circuit including three phases 22, 23, 24 and a secondary circuit including three phases 25, 26, 27.

Each phase 25, 26, 27 of the secondary circuit is connected to a different output 6, 7, 8 of the power supply system 1.

Each phase 25, 26, 27 of the secondary circuit comprises a sensing module 300, 301, 302 comprising a voltage sensor and a current sensor measuring a voltage and a current of the said phase.

The first disconnector 13 connects each input 16, 17, 18 of the power converter 9 to a different phase 22, 23, 24 of the primary circuit, and the second disconnector 14 connects each output 19, 20, 21 of the power converter 9 to a different phase 22, 23, 24 of the primary circuit.

The third disconnector 15 connects each input 16, 17, 18 of the power converter 9 to a different output 19, 20, 21 of the power converter 9.

In variant, the first disconnecting means do not comprise the third disconnector 15, the inputs 16, 17, 18 of the power converter 9 being not connected to the outputs 19, 20, 21 of the power converter 9.

Figure 2:
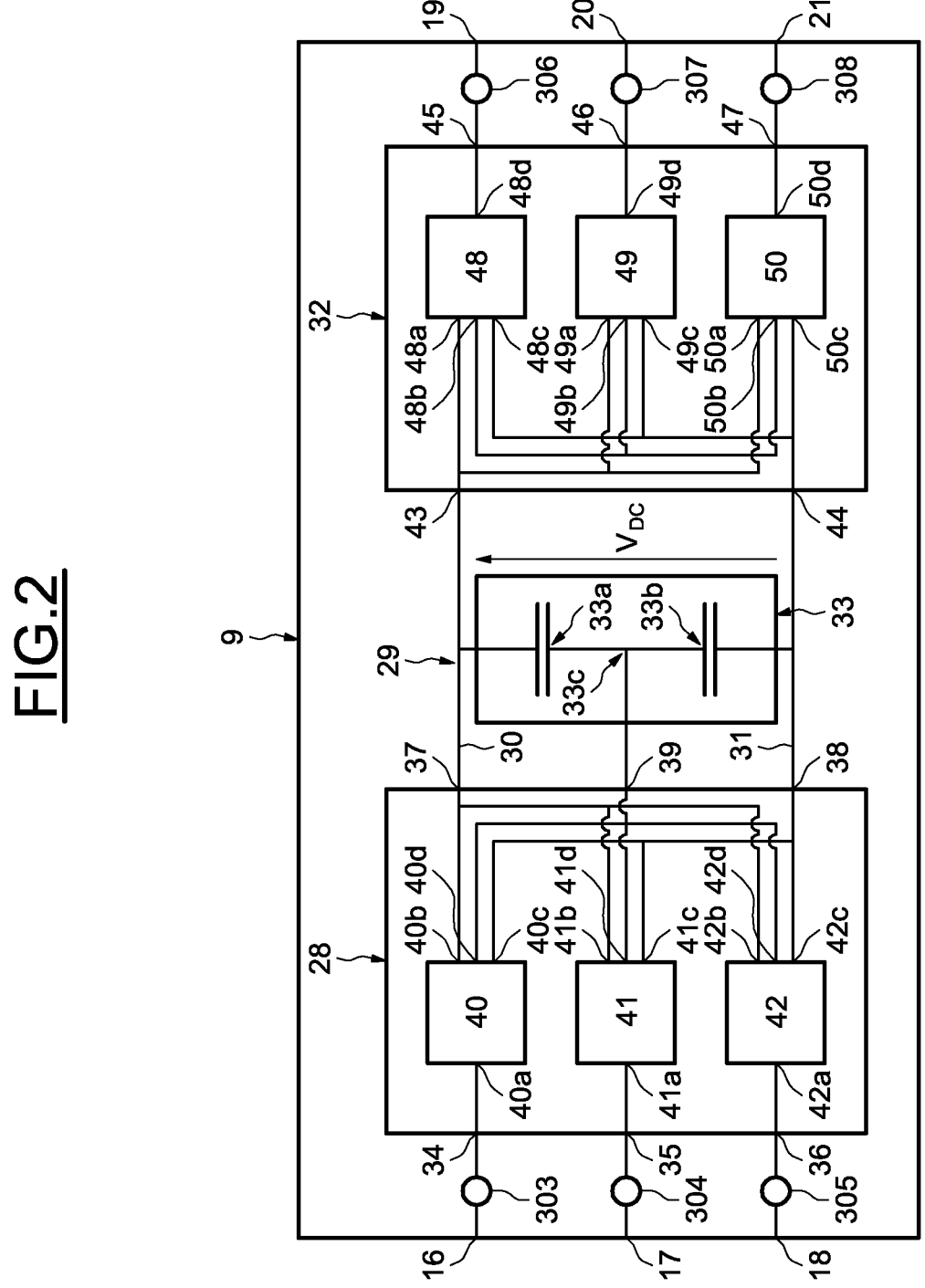
FIG. 2 illustrates schematically an example of a power converter according to the invention.

FIG. 2 illustrates an example of the power converter 9.

The power converter 9 further comprises an input device 28, a link circuit 29 comprising a first bus 30 and a second bus 31, and an output device 32.

Each input 16, 17, 18 of the power converter 9 comprises a sensing module 303, 304, 305 comprising a voltage sensor and a current sensor measuring a voltage and a current of the said input.

Each output 19, 20, 21 of the power converter 9 comprises a sensing module 306, 307, 308 comprising a voltage sensor and a current sensor measuring a voltage and a current of the said input.

The first bus 30 may have a potential higher than the second bus 31.

The voltage between the first and second buses 30, 31 is noted VDC.

The link circuit 25 may further comprise a filtering module 33 including two energy storage devices 33a, 33b connected in series.

A first end of a first energy storage device 33a is connected to the first bus 30, a first end of the second energy storage 33b is connected to the second bus 31, and the first end of the second energy storage 33b and the second end of the first energy storage 33a are connected to a connecting node 33c.

Each energy storage device 33a, 33b comprises for example a capacitor.

The input device 28 comprises three inputs 34, 35, 36 and three outputs 37, 38, 39.

Each input 34, 35, 36 of the input device 28 is connected to a different input 16, 17, 18 of the power converter 9.

A first output 37 of the input device 28 is connected to the first bus 30, a second output 38 of the input device 28 is connected to the second bus 31, and the third output 39 is connected to the connecting node 33c.

The input device 28 further comprises identical input modules 40, 41, 42.

Each input module 40, 41, 42 is connected to a different input 34, 35, 36 of the input device 28.

Each input module 40, 41, 42 comprises an input 40a, 41a, 42a connected to the input 34, 35, 36 of the input device 28, a first output 40b, 41b, 42b connected to the first output 37 of the input device 28, a second output 40c, 41c, 42c connected to the second output 38 of the input device 28, and a third output 40d, 41d, 42d connected to the third output 39 of the input device 28.

The output device 32 comprises two inputs 43, 44 and three outputs 45, 46, 47.

A first input 43 of the output device 32 is connected to the first bus 30 and the second input 44 is connected to the second bus 31.

A first output 45 of the output device 32 is connected to a first output 19 of the power converter 9, a second output 46 is connected to a second output 20 of the power converter 9, and a third output 47 is connected to the third output 21 of the power converter 9.

The output device 32 further comprises identical output modules 48, 49, 50.

Each output module 48, 49, 50 comprises a first input 48a, 49a, 50a connected to the first input 43 of the output device 32, a second input 48b, 49b, 50b connected with the second input of the other output modules, and a third input 48c, 49c, 50c connected to the second input 44 of the output device 32.

Each output module 48, 49, 50 further comprises an output 48d, 49d, 50d connected to a different output 45, 46, 47 of the output device 32.

The input device 28 is intended to supply the link circuit 29 with a continuous voltage from the grid G.

The output device 32 is intended to supply with electrical energy the electrodes 2a, 2b, 2c through the transformer 10.

The energy storage devices 33a, 33b are designed to filter the continuous voltage of the link circuit 29 to stabilize the continuous voltage and to filter the current variation on the buses 30, 31.

The filtering module 33 may decouple the input device 28 and the output device 32 to avoid that electrical perturbations generated by the arc furnace 2 are rejected on the grid G.

In variant, the link circuit 29 may not comprise the fileting module 33, the third output 39 of the input device 28 being not connected.

Figure 3:
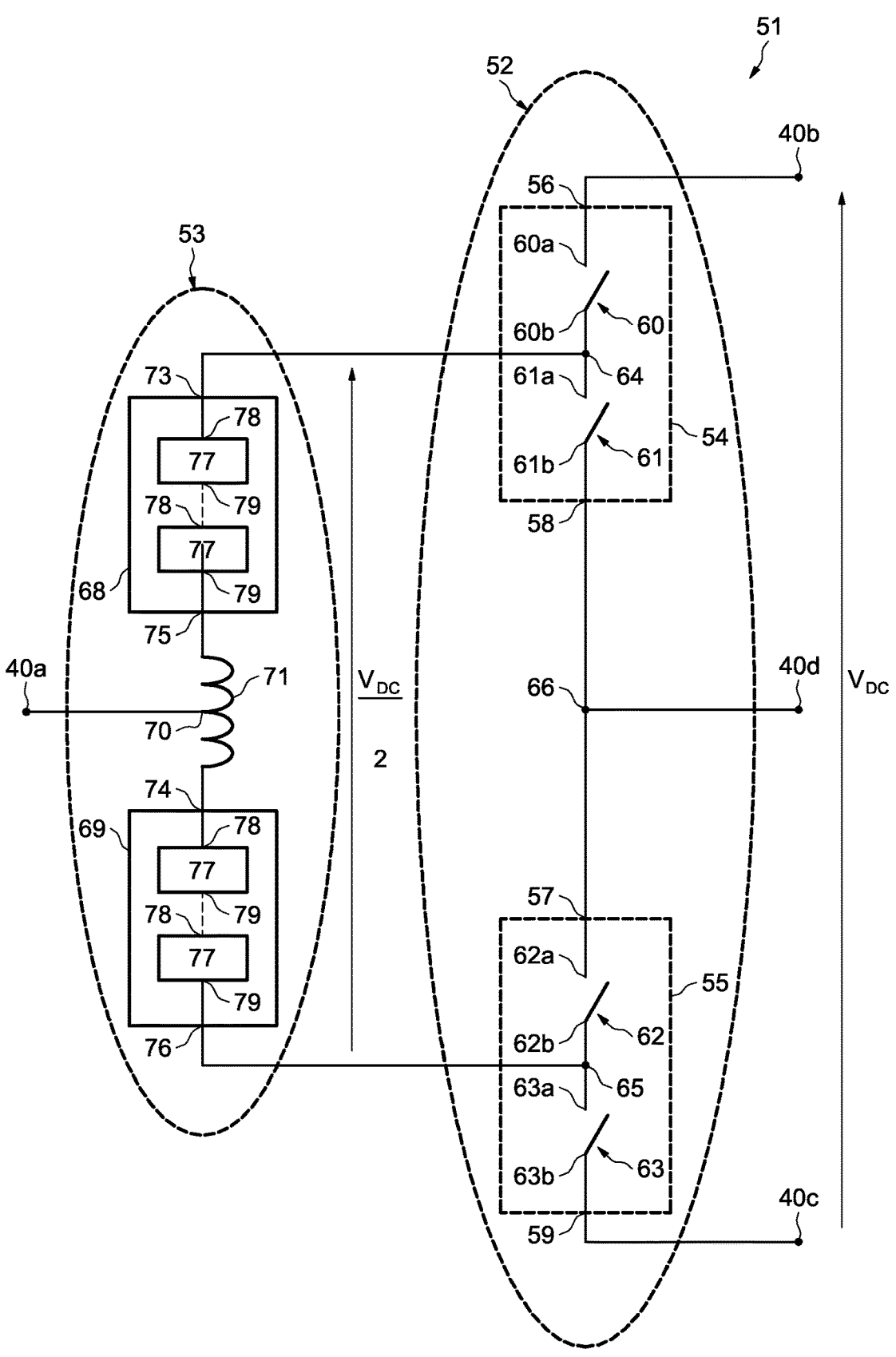
FIG. 3 illustrates schematically a first example of an input module according to the invention.

As the input modules 40, 41, 42 are identical, FIG. 3 illustrates schematically a first example of the input module 40.

The input module 40 comprises a leg 51 comprising a first string 52 and a second string 53.

The first string 52 comprises a first branch 54 and a second branch 55.

Each branch 54, 55 comprises a first end 56, 57, a second end 58, 59, two switches 60, 61, 62, 63 connected in series and extending between the first and second ends 56, 57, 58, 59.

The first branch 54 further comprises a first connecting node 64 situated between the switches 60, 61 and the second branch 55 further comprises a second connecting node 65 situated between the switches 62, 63.

Each branch 54, 55 may comprise more than two switches, the two branches comprising a same number of switches.

Each switch 60, 61, 62, 63 comprises a first end 60a, 61a, 62a, 63a and a second end 60b, 61b, 62b, 63b.

The switches 60, 61 of the first branch 54 are connected in series so that the first end 61a of the switch 61 is connected to the second end 60b of the switch 60.

The first end 56 of the first branch 54 is connected to the first remaining end 60a of the switch 60 and the second end 58 of the first branch 54 is connected to the second remaining end 61b of the switch 61.

The remaining end of a switch is the end of the said switch which is not connected to an end of another switch.

The switches 62, 63 of the second branch 55 are connected in series so that the first end 63a of the switch 63 is connected to the second end 62b of the switch 62.

The first end 57 of the second branch 55 is connected to the first remaining end 62a of the switch 62 and the second end 59 of the second branch 55 is connected to the second remaining end 63b of the switch 63.

The first end 56 of the first branch 54 is connected to the first output 40b, the second end 59 of the second branch 55 is connected to the second output 40c, and the second end 58 of the first branch 54 and the first end 57 of the second branch 55 are connected to a third connecting node 66.

The third connecting node 66 is connected to the third output 40d.

The second string 53 comprises a first portion 68, and a second portion 69.

The second string 53 may further comprise a first inductor 71.

Each portion 68, 69 comprises a first end 73, 74, a second end 75, 76, and a plurality of switching units 77, each switching unit 77 comprising a first connection 74 and a second connection 75.

Each portion 64, 65 comprises a same number of switching units 77.

Each switching unit 77 includes a plurality of controllable switches and at least one energy storage device, the controllable switches being intended to bridge the energy storage device or to connect the energy storage device in each switching unit 77.

The switching units 77 of each portion 68, 69 are connected in series so that the first connection 78 of a switching unit 77 is connected to a second connection 79 of an adjacent switching unit 77.

The first remaining connection 78 of the switching unit 77 of the first portion 68 is connected to the first end 73 and the second remaining connection 79 of the switching unit 77 of the first portion 68 is connected to the second end 75.

The remaining connection of a switching unit is the connection of the said switching unit which is not connected to a connection of another switching unit.

The first end 73 of the first portion 68 is connected to the first connecting node 64 and the second end 75 is connected to a first end of the first inductor 71.

The first remaining connection 78 of the switching unit 77 of the second portion 69 is connected to the first end 74 and the second remaining connection 79 of the switching unit 77 of the second portion 69 is connected to the second end 76.

The first end 74 of the second portion 69 is connected to a second end of the first inductor 71 and the second end 76 is connected to the second connecting node 65.

The second string 53 further comprises a first mid-connecting node 70 connecting the input 40a of the input module 40 to a mid-connecting node of the first inductor 71.

The first inductor 71 permits to limit current peaks in the second string 53 and the phases of the grid G during commutations of the switching units 77.

In variant, the second string 53 does not comprise the first inductor 71, the ends 74, 75 of the first and second portions 68, 69 and the input 40a of the input module 40 being connected to the first mid-connecting node 70, the first portion 68 or the second portion 69 comprising an inductor to limit the current peaks in the second string 53 and the second string 53 comprises another inductor connecting the input 40a of the input module 40 to the first mid-connecting node 70 to limit the current peaks in the phase of the grid G.

In another variant, the second string 53 does not comprise the first inductor 70, the ends 74, 75 of the first and second portions 68, 69 and the input 40a of the input module 40 are connected to the first mid-connecting node 70, each of the first portion 68 and the second portion 69 comprising an inductor to limit the current peaks in the second string 53 and the second string 53 may comprise another inductor connecting the input 40a of the input module 40 to the first mid-connecting node 70 to limit the current peaks in the phase of the grid G.

Figure 4:
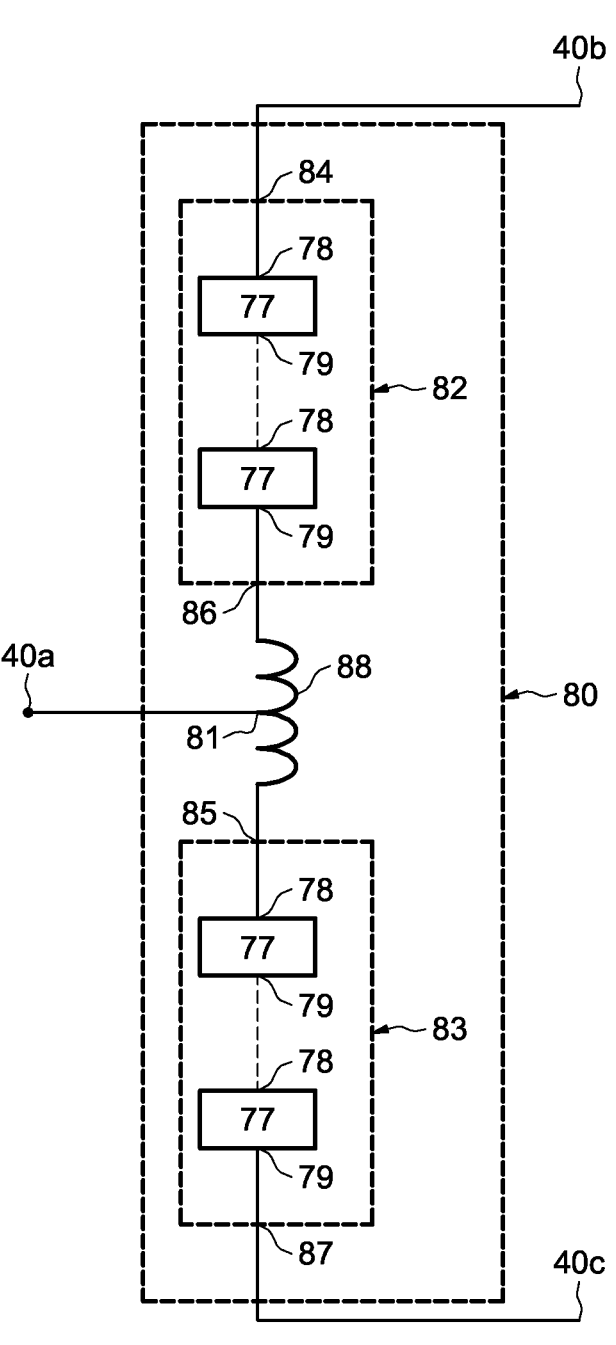
FIG. 4 illustrates schematically a second example of the input module known form the prior art.

FIG. 4 illustrates schematically a second example of the input module 40.

The output module 40 comprises a first portion 82 and a second portion 83.

The input module 40 may comprise a second inductor 88.

Each portion 82, 83 comprises a first end 84, 85, a second end 86, 87, and a plurality of switching units 77.

The first end 84 of the first portion 82 is connected to the first output 40b of the input module 40 and the second end 87 of the second portion 83 is connected to the second output 40c of the input module 40.

The third output 40d of the input module 40 is not connected.

The switching units 77 of each portion 82, 83 are connected in series so that the first connection 78 of a switching unit 77 is connected to a second connection 79 of an adjacent switching unit 77.

The first remaining connection 78 of the switching units 77 of the first portion 82 is connected to the first end 84 and the second remaining connection 79 of the switching units 77 of the first portion 82 connected to the second end 86.

The remaining connection of a second switch unit is the connection of the said second unit which is not connected to a connection of another second switch unit.

The first remaining connection 78 of the switching units 77 of the second portion 83 is connected to the first end 85 and the second remaining connection 79 of the switching units 77 of the second portion 83 is connected to the second end 87.

A first end of the second inductor 88 is connected to the second end 86 of the first portion 82 and a second end of the second inductor 88 is connected to the first end 85 of the second portion 83.

The input module 40 further comprises a second mid-connecting node 81 connecting the input 40a of the input module 40 to a mid-connecting node of the second inductor 88.

The second inductor 88 permits to limit current peaks in the first portion 82, the second portion 83, the phases of the grid G during commutations of the switching units 77 during commutations of the second switching units 77.

In variant, the input module 40 does not comprise the second inductor 88, the ends 85, 86 of the first portion 82 and the second portion 83 and the input 40a of the input module 40 being connected to the second mid-connecting node 81, the first portion 82 or the second portion 83 comprising an inductor to limit the current peaks in the input module 40, and the input module 40 comprises another inductor connecting the input 40a of the input module 40 to the second mid-connecting node 81 to limit the current peaks in the grid G.

In another variant, the input module 40 does not comprise the second inductor 88, the ends 85, 86 of the first portion 82 and the second portion 83 and the input 40a of the input module 40 being connected to the second mid-connecting node 81, each of the first portion 82 and the second portion 83 comprising an inductor to limit the current peaks in the input module 40, and the input module 40 may comprise another inductor connecting the input 40a of the input module 40 to the second mid-connecting node 81 to limit the current peaks in the grid G.

Figure 5:
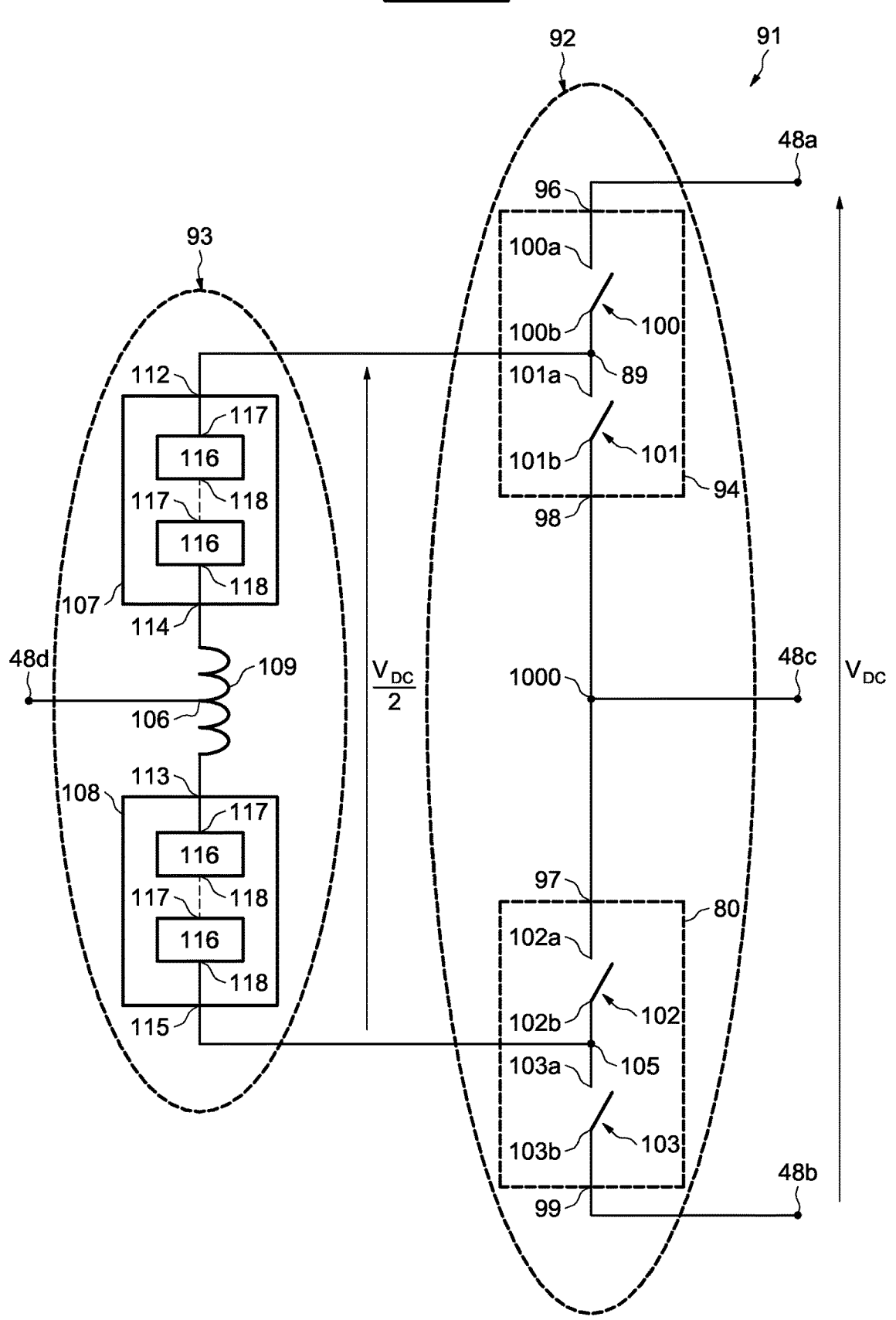
FIG. 5 illustrates schematically a first example of an output module according to the invention.

As the output modules 48, 49, 50 are identical, FIG. 5 illustrates schematically a first example of the output module 48.

The output module 44 comprises a second leg 91 comprising a fourth string 92 and a fifth string 93.

The fourth string 92 comprises a first branch 94 and a second branch 95.

Each branch 94, 95 comprises a first end 96, 97, a second end 98, 99, two second switches 100, 101, 102, 103 connected in series and extending between the first and second ends 96, 97, 98, 99.

Each branch 94, 95 may comprise more than two second switches, the two branches comprising a same number of second switches.

Each second switch 100, 101, 102, 103 comprises a first end 100a, 101a, 102a, 103a and a second end 100b, 101b, 102b, 103b.

The second switches 100, 101 of the first branch 94 are connected in series so that the first end 101a of the second switch 101 is connected to the second end 100b of the second switch 100.

The first end 96 of the first branch 94 is connected to the first remaining end 100a of the second switch 100 and the second end 98 of the first branch 94 is connected to the second remaining end 101b of the second switch 101.

The remaining end of a second switch is the end of the said second switch which is not connected to an end of another second switch.

The second switches 102, 103 of the second branch 95 are connected in series so that the first end 103a of the second switch 103 is connected to the second end 102b of the second switch 102.

The first end 97 of the second branch 95 is connected to the first remaining end 102a of the second switch 102 and the second end 99 of the second branch 95 is connected to the second remaining end 103b of the second switch 103.

The first branch 94 further comprises a fourth connecting node 104 situated between the second switches 100, 101 and the second branch 95 further comprises a fifth connecting node 105 situated between the second switches 102, 103.

The first end 96 of the first branch 94 is connected to the first input 48a, the second end 99 of the second branch 95 is connected to the second input 48b, and the second end 98 of the first branch 94 and the first end 97 of the second branch 95 are connected to a sixth connecting node 1000.

The sixth connecting node 1000 is connected to the third input 48c.

Each branch 104, 105 comprises the same number of second switches.

The fifth string 93 comprises a third portion 107 and a fourth portion 108.

The fifth string 93 may further comprise a third inductor 109.

Each portion 107, 108 comprises a first end 112, 113 a second end 114, 115, and a plurality of second switching units 116, each second switching unit 116 comprising a first connection 117 and a second connection 118.

Each portion 107, 108 comprises a same number of second switching units 116.

The second switching units 116 of each portion 107, 108 are connected in series so that the first connection 117 of a second switching unit 116 is connected to a second connection 118 of an adjacent switching unit 116.

The first remaining connection 117 of the second switching units 116 of the third portion 107 is connected to the first end 112 and the second remaining connection 118 of the second switching units 116 of the third portion 107 is connected to the second end 114.

The remaining connection of a second switch is the end of the said second switch which is not connected to an end of another second switch.

The first end 112 of the third portion 107 is connected to the fourth connecting node 104 and the second end 114 is connected to a first end of the third inductor 109.

The first remaining connection 117 of the second switching units 116 of the fourth portion 108 is connected to the first end 113 and the second remaining connection 118 of the second switching units 116 of the fourth portion 108 is connected to the second end 115.

The first end 113 of the fourth portion 108 is connected to a second end of the third inductor 109 and the second end 115 is connected to the fifth connecting node 105.

The fifth string 93 further comprises a third mid-connecting node 106 connecting the output 48d of the output module 48 to a mid-connecting node of the third inductor 109.

The third inductor 109 permits to limit current peaks in the fifth string 93 and the phases of the arc furnace 2 during commutations of the switching units 116.

In variant, the fifth string 93 does not comprise the third inductor 109, the ends 113, 114 of the third and fourth portions 107, 108 and the output 48d of the output module 48 being connected to the third mid-connecting node 106, the third portion 107 or the fourth portion 108 comprising an inductor to limit the current peaks in the fifth string 93, and the fifth string 93 comprises another inductor connecting the output 40*d* of the output module 40 to the third mid-connecting node 106 to limit the current peaks in the phase of the arc furnace 2.

In another variant, the fifth string 93 does not comprise the third inductor 109, the ends 113, 114 of the third and fourth portions 107, 108 and the output 40*d* of the output module 40 being connected to the third mid-connecting node 106, each of the third portion 107 and the fourth portion 108 comprising an inductor to limit the current peaks in the fourth string 108, and the fourth string 108 may comprise another inductor connecting the output 40*d* of the output module 40 to the third mid-connecting node 106 to limit the current peaks in the phase of the arc furnace 2.

Figure 6:
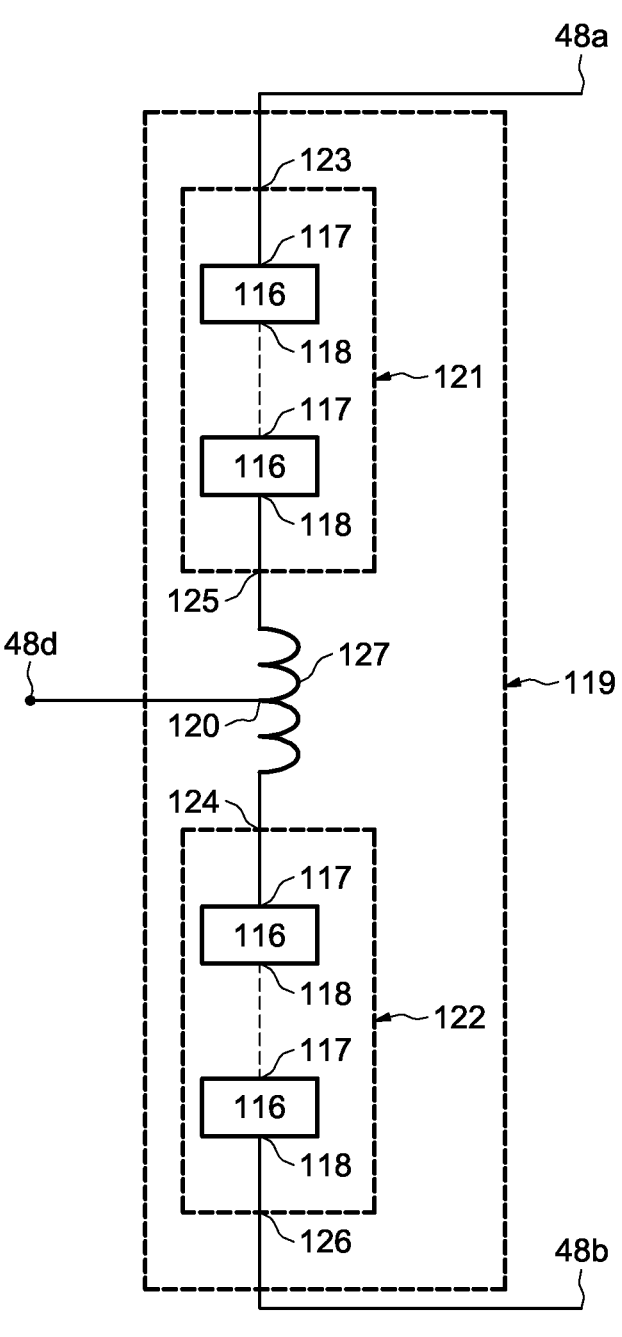
FIG. 6 illustrates schematically a second example of the output module know form the prior art.

FIG. 6 illustrates schematically a second example of the output module 48.

The output module 48 comprises a first portion 121 and a second portion 122.

The output module 48 may comprise a fourth inductor 127.

Each portion 121, 122 comprises a first end 123, 124, a second end 125, 126, and a plurality of second switching units 116.

The first end 123 of the first portion 121 is connected to the first input 48*a* of the output module 48 and the second end 126 of the second portion 122 is connected to the second input 48*b* of the output module 48.

The third input 48*c* of the output module 48 is not connected.

The second switching units 116 of each portion 121, 122 are connected in series so that the first connection 117 of a switching unit 116 is connected to a second connection 118 of an adjacent switching unit 116.

The first remaining connection 117 of the second switching units 116 of the first portion 121 is connected to the first end 123 and the second remaining connection 118 of the second switching units 116 of the first portion 121 connected to the second end 125.

The remaining connection of a second switch unit is the connection of the said second unit which is not connected to a connection of another second switch unit.

The first remaining connection 117 of the second switching units 116 of the second portion 122 is connected to the first end 124 and the second remaining connection 118 of the second switching units 116 of the second portion 122 is connected to the second end 126.

A first end of the fourth inductor 127 is connected to the second end 86 of the first portion 121 and a second end of the fourth inductor 127 is connected to the first end 124 of the second portion 122.

The output module 48 further comprises a fourth mid-connecting node 120 connecting the output 48*da* of the output module 48 to a mid-connecting node of the fourth inductor 127.

The fourth inductor 127 permits to limit current peaks in the first portion 121, the second portion 122, the phases of the arc furnace 2 during commutations of the switching units 116.

In variant, the output module 48 does not comprise the fourth inductor 127, the ends 124, 125 of the first portion 121 and the second portion 122 and the output 48*d* of the output module 48 being connected to the fourth mid-connecting node 120, the first portion 121 or the second portion 122 comprising an inductor to limit the current peaks in the output module 48, and the output module 48 comprises another inductor connecting the output 48*d* of the output module 48 to the fourth mid-connecting node 120 to limit the current peaks in the phases of the arc furnace 2.

In another variant, the output module 48 does not comprise the fourth inductor 127, the ends 124, 125 of the first portion 121 and the second portion 122 and the output 48*d* of the output module 48 being connected to the fourth mid-connecting node 120, each of the first portion 121 and the second portion 122 comprising an inductor to limit the current peaks in the output module 48, and the output module 48 may comprise another inductor connecting the output 48*d* of the output module 48 to the fourth mid-connecting node 120 to limit the current peaks in the phases of the arc furnace 2.

The first example of the input module 40 illustrated on FIG. 3 and the first example of the output module 48 illustrated on FIG. 5 are known from the EP 2 713 495, and the second example of the input module 40 illustrated on FIG. 4 and the second example of the output module 48 illustrated on FIG. 6 are known from the EP 2 329 684.

As explained in document EP 2 713 495, the voltage between the first and second connecting nodes 64, 65 of each input module 40, 41, 42 as illustrated on FIG. 3 and the voltage between the fourth and fifth connecting nodes 104, 105 of each output module 48, 49, 50 as illustrated on FIG. 5 is equal to VDC/2 so that the number of switching units 77 and second switching units 116 is reduced, at least divided by two, compared to the number of switching units 77 and second switching units 116 in the second example of input modules 40, 41, 42 and output modules 48, 49, 50 as illustrated on FIGS. 4 and 6.

The reduction of switching units 77 and second switching units 116 reduces the complexity of the power converter 9 and the power loses generated by the power converter 9.

Figure 7:
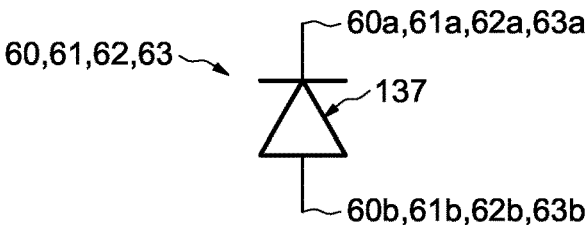
FIG. 7 illustrates schematically an embodiment of switches according to the invention.

FIG. 7 illustrates schematically an embodiment of the switches 60, 61, 62, 63.

The switch 60, 61, 62, 63 comprises a diode 137 extending between the first and the second ends of the switch 60, 61, 62, 63 so that the anode of the diode 137 is connected to the second end 60*b*, 61*b*, 62*b*, 63*b* of the switch and the cathode is connected to the first end 60*a*, 61*a*, 62*a*, 63*a* of the switch 60, 61, 62, 63.

As the diode 137 does need to be controlled by the control circuit 11, the first example of the switch comprising the diode 137 simplify the implementation of the switches 60, 61, 62, 63 in the input modules 40, 41, 42.

Each switch 60, 61, 62, 63 may comprise a plurality of diodes 137 in series so that the anode of one diode is connected to the cathode of another diode.

When the switches 60, 61, 62, 63 are implemented in the first example of the input modules 40, 41, 42 according to the FIG. 3 or the first example of the output modules 48, 49, 50 according to the FIG. 5, the diode 137 is designed to support a voltage at least equal to VDC/2.

Each switch 60, 61, 62, 63 implemented in the first example of the input modules 40, 41, 42 or in the first example of the output modules 48, 49, 50 may comprise a plurality of diodes 137 in series so that the anode of one diode is connected to the cathode of another diode, the number of diodes 137 being determined so that the set of diodes 137 in series supports a voltage at least equal to VDC/2.

Figure 8:
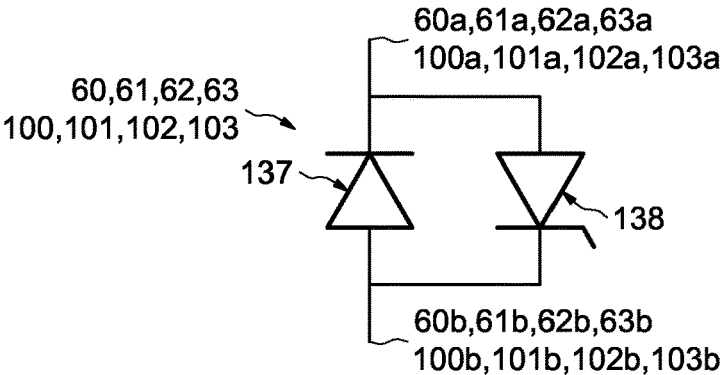
FIG. 8 illustrates schematically another embodiment of the switches according to the invention.

FIG. 8 illustrates schematically another embodiment of the switches 60, 61, 62, 63 and the second switches 100, 101, 102, 103.

Each switch of the switches 60, 61, 62, 63 and the second switches 100, 101, 102, 103 comprises the diode 137 extending between the first and the second ends of the switch 60, 61, 62, 63, 100, 101, 102, 103 so that the anode of the diode 137 is connected to the second end 60*b*, 61*b*, 62*b*, 63*b*, 100*b*, 101*b*, 102*b*, 103*b* of the switch and the cathode is connected to the first end 60*a*, 61*a*, 62*a*, 63*a*, 100*a*, 101*a*, 102*a*, 103*a* of the switch 60, 61, 62, 63, 100, 101, 102, 103.

Each switch 60, 61, 62, 63, 100, 101, 102, 103 further comprises a gate turn off thyristor 138.

The gate of the gate turn off thyristor 138 is connected to the control circuit 11, the anode of the gate turn off thyristor 138 is connected to the cathode of the diode 137, and the cathode of the gate turn off thyristor 138 is connected to the anode of the diode 137.

Each switch 60, 61, 62, 63 may comprise a plurality of gate of the gate turn off thyristors 138 in series so that the anode of one thyristor is connected to the cathode of another thyristor.

When the switches 60, 61, 62, 63 are implemented in the first example of the input modules 40, 41, 42 according to the FIG. 3 or the first example of the output modules 48, 49, 50 according to the FIG. 5, the gate turn off thyristor 138 is designed to support a voltage at least equal to VDC/2.

Each switch 60, 61, 62, 63 implemented in the first example of the input modules 40, 41, 42 or in the first example of the output modules 48, 49, 50 may comprise a plurality of gate turn off thyristors 138 in series so that the anode of one diode is connected to the cathode of another diode, the number of gate turn off thyristors 138 being determined so that the set of gate turn off thyristors 138 in series supports a voltage at least equal to VDC/2.

Figure 9:
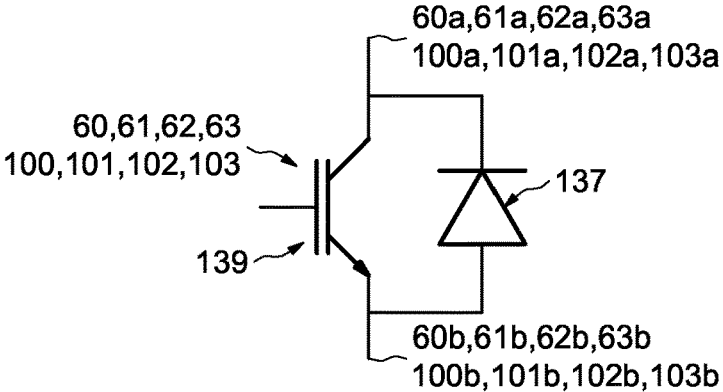
FIG. 9 illustrates schematically another embodiment of the switches according to the invention.

FIG. 9 illustrates schematically yet another embodiment of the switches 60, 61, 62, 63 and the second switches 100, 101, 102, 103.

Each switch of the switches 60, 61, 62, 63 and the second switches 100, 101, 102, 103 comprises the diode 137 extending between the first and the second ends of the switch 60, 61, 62, 63, 100, 101, 102, 103 so that the anode of the diode 137 is connected to the second end 60*b*, 61*b*, 62*b*, 63*b*, 100*b*, 101*b*, 102*b*, 103*b* of the switch and the cathode is connected to the first end 60*a*, 61*a*, 62*a*, 63*a*, 100*a*, 101*a*, 102*a*, 103*a* of the switch 60, 61, 62, 63, 100, 101, 102, 103.

Each switch 60, 61, 62, 63, 100, 101, 102, 103 further comprises a field effect transistor 139.

The field effect transistor 139 may be an insulated gate bipolar transistor IGBT.

The gate of the transistor 139 is connected to the control circuit 11, the drain of the transistor 139 is connected to the cathode of the diode 137 and the source of the transistor 139 is connected to the anode of the diode 137.

Each switch 60, 61, 62, 63 may comprise a plurality of transistors 139 in series so that the drain of one transistor is connected to the source of another transistor.

When the switches 60, 61, 62, 63 are implemented in the first example of the input modules 40, 41, 42 according to the FIG. 3 or the first example of the output modules 48, 49, 50 according to the FIG. 5, the transistor 139 is designed to support a voltage at least equal to VDC/2.

Each switch 60, 61, 62, 63 implemented in the first example of the input modules 40, 41, 42 or in the first example of the output modules 48, 49, 50 may comprise a plurality of transistors 139 in series so that the drain of one transistor is connected to the source of another transistor, the number of transistors 139 being determined so that the set of transistors 139 in series supports a voltage at least equal to VDC/2.

The inputs modules 40, 41, 42 may comprise one embodiment of the switches 60, 61, 62, 63 illustrated on FIGS. 7,

8, 9, and the output modules 48, 49, 50 may comprise one embodiment of the second switches 100, 101, 102, 103 illustrated on FIG. 8, 9, the embodiment of the switches 60, 61, 62, 63 and the embodiment of the second switches 100, 101, 102, 103 may be different so that for example the switches 60, 61, 62, 63 comprise the embodiment illustrated on FIG. 8 and the second switches 100, 101, 102, 103 comprise the embodiment illustrated on FIG. 9.

Figure 11:
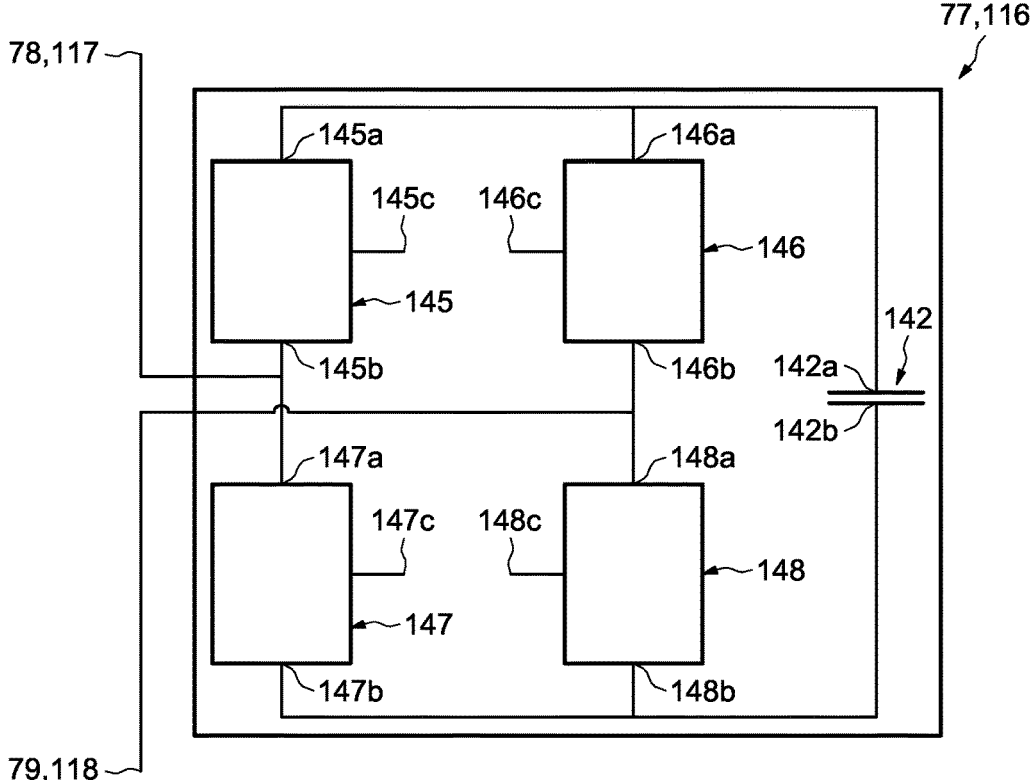
FIG. 11 illustrates schematically a second embodiment of switching units according to the invention.

In variant, the embodiment of the switches 60, 61, 62, 63 and the embodiment of the second switches 100, 101, 102, 103 may have the same architecture, for example the switches 60, 61, 62, 63 and the second switches 100, 101, 102, 103 comprise the embodiment illustrated on FIG. 11.

Figure 10:
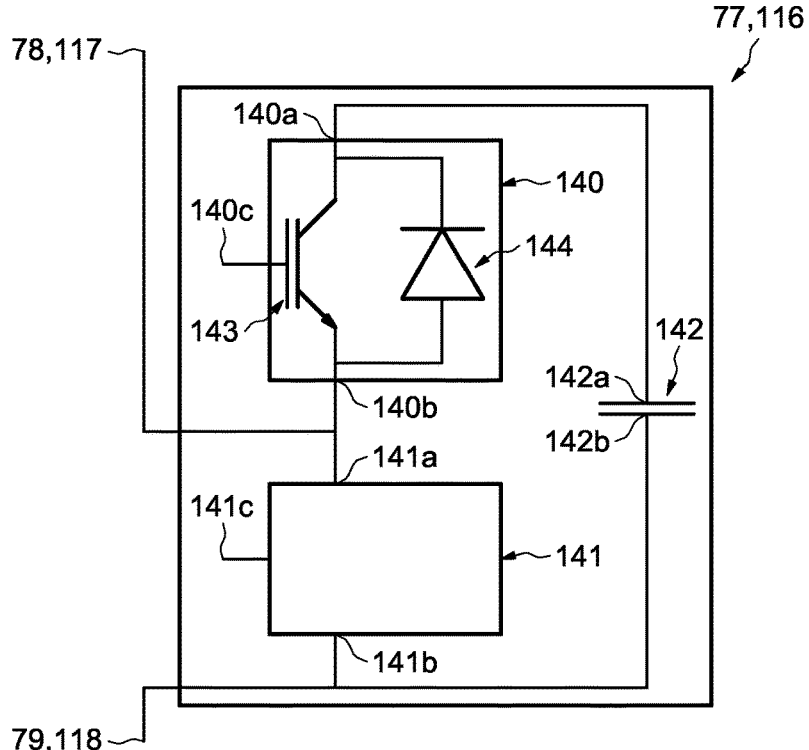
FIG. 10 illustrates schematically a first embodiment of switching units according to the invention.

FIG. 10 illustrates schematically a first embodiment of the switching unit 77 and the second switching unit 116.

Each one of the switching unit 77 and the second switching unit 116 comprises two controllable switches 140, 141 and a second energy storage 142 comprising a first end 142*a* and a second end 142*b*.

The second energy storage 142 comprises for example a capacitor.

Each controllable switch 140, 141 comprises a first end 140*a*, 141*a*, a second end 140*b*, 141*b*, and a control input 140*c*, 141*c* connected to the control circuit 11.

The first end 140*a* of a first controllable switch 140 is connected to the first end 142*a* of the second energy storage 142.

The second end 140*b* of the first controllable switch 140 and the first end 141*a* of the second controllable switch 141 are connected to the first end 78, 117 of the switching unit 77 or second switching unit 116.

The second end 141*b* of the second controllable switch 141 is connected to the second end 142*b* of the second energy storage 142 and to the second end 79, 118 of the switching unit 77 or second switching unit 116.

As the controllable switches 140, 141 are identical, only the first switch 130 is detailed.

The first switch 140 comprises a second transistor 143 and a second diode 144.

The second transistor 143 may be a field effect transistor, for example an IGBT transistor.

The gate of the second transistor 143 is connected to the control input 140*c*, the drain of the second transistor 143 and the cathode of the second diode 144 are connected to the first end 140*a*, and the source of the second transistor 143 and the anode of the second diode 144 are connected to the second end 140*b*.

FIG. 11 illustrates schematically a second embodiment of the switching unit 77 and the second switching unit 116.

Figure 13:
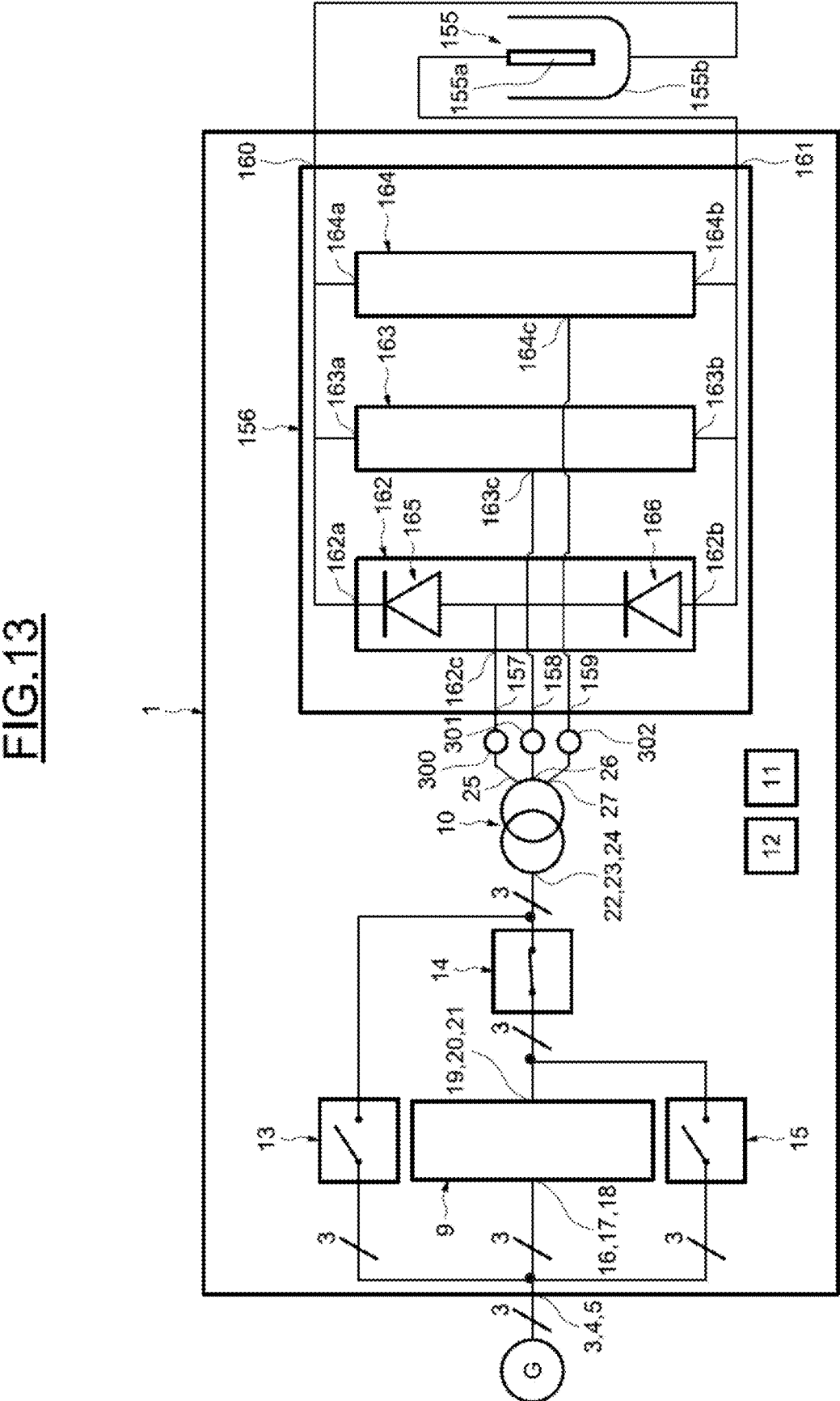
FIG. 13 illustrates a second example of the arc furnace facility according to the invention.

Each one of the switching units 77 and the second switching units 126 comprises four controllable switches 145, 146, 147, 148 identical to the controllable switches 140, 141 of the first embodiment illustrated on FIG. 13.

Each controllable switches 145, 146, 147, 148 comprises a first end 145*a*, 146*a*, 147*a*, 148*a*, a second end 145*b*, 146*b*, 147*b*, 148*b*, and a control input 145*b*, 146*b*, 147*b*, 148*b* connected to the control circuit 11.

Each controllable switches 145, 146, 147, 148 further comprises the second energy storage 142.

The first end 145*a* of a first controllable switch 145 and the first end 146*a* of a second controllable switch 146 are connected to the first end 142*a* of the second energy storage 142.

The second end 147*b* of a third controllable switch 147 and the second end 148*b* of the fourth controllable switch 148 are connected to the second end 142*b* of the second energy storage 142.

The second end 145*b* of the first controllable switch 145 and the first end 147*a* of the third controllable switch 147 are connected to the first end 78, 117 of the switching unit 77 or second switching unit 116.

The second end 146*b* of the second controllable switch 146 and the first end 148*a* of the fourth controllable switch 148 are connected to the second end 79, 118 of the switching unit 77 or second switching unit 116.

The switching units 77 and the second switching units 116 according to the first embodiment illustrated on FIG. 13 have two states, each state delivering a different voltage value on the ends of the switching units 77 and the second switching units 116.

For example, in a first state, the switching units 77, 116 deliver a positive compensating voltage Vcc, and in a second state a nil voltage.

The switching units 77 and the second switching units 116 according to the second embodiment illustrated on FIG. 14 have three states, each state delivering a different voltage value on the ends of the switching units 77 and the second switching units 116.

For example, in a first state, the switching units 77, 116 deliver a positive voltage Vcc, in a second state a nil voltage, and in a third state a negative compensating voltage –Vcc.

The embodiment of the switching units 77 of inputs modules 40, 41, 42 and the embodiment of the second switching units 116 of the output modules 48, 49, 50 may be identical or different, for example the switching units 77 may have the architecture of the first embodiment illustrated on FIG. 13 and the second switching units 116 may have the architecture of the second embodiment illustrated on FIG. 14.

Figure 12:
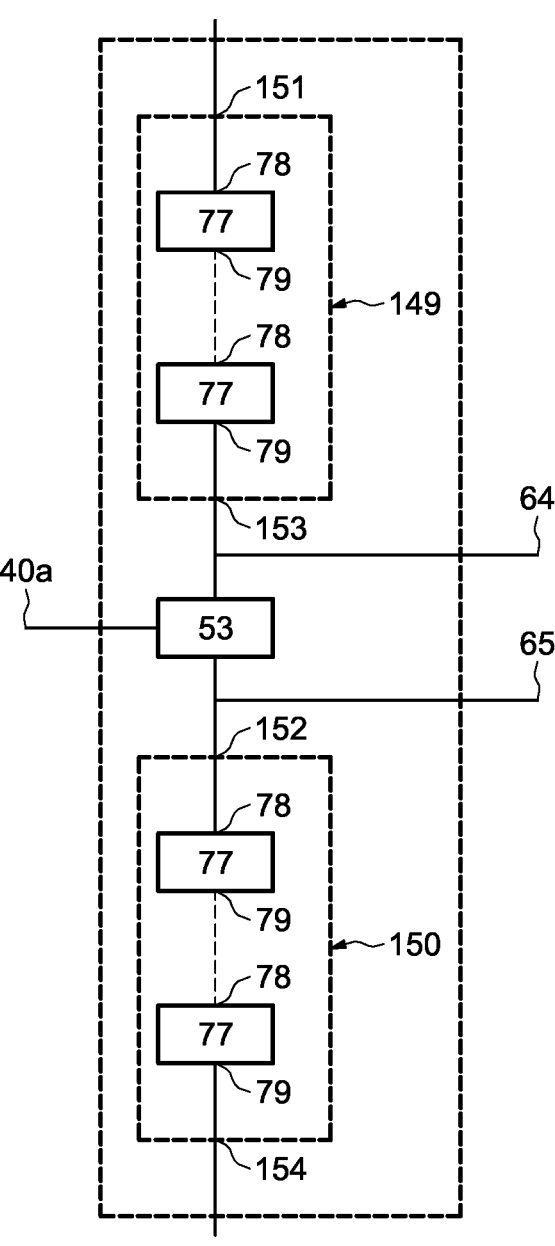
FIG. 12 illustrates schematically a third example of the input module according to the invention.

FIG. 12 illustrates schematically a third example of the input modules 40, 41, 42.

As the input modules 40, 41, 42 are identical, the first module 40 is detailed in the following.

The second example differs from the first example of the input module 40 illustrated on FIG. 3 in that the leg 51 further comprises two compensating modules 149, 150 comprising a first end 151, 152, a second end 153, 154, and a plurality of switching units 77.

The first end 151 of a first compensating module 149 is connected with the first end of the first compensating module of the other inputs modules 41, 42 and the second end 153 of the second compensating module 150 is connected with the second end of the second compensating module of the other inputs modules 41, 42.

The second end 153 of the first compensating module 149 is connected to the first connecting node 64 and the first end 136 of the second compensating module 134 is connected to the second connecting node 65.

Each compensating module 149, 150 comprises a same number of switching units 77 connected in series so that the first end 78 of a switching unit 77 is connected to the second end 79 of an adjacent switching unit 77.

The first remaining connection 78 of the switching units 77 of the first compensating module 149 is connected to the first end 151 of the first compensating module 149 and the second remaining connection 79 of the switching units 77 of the first compensating module 149 is connected to the second end 153 of the first compensating module 149.

The first remaining connection 78 of the switching units 77 of the second compensating module 150 is connected to the first end 152 of the second compensating module 150 and the second remaining connection 79 of the switching units 77 of the second compensating module 150 is connected to the second end 154 of the second compensating module 150.

The two compensating modules 149, 150 act as static synchronous compensator STATCOM to enhance the quality of filtering of the supply system 1 to limit the rejections of the arc furnace on the grid G.

This example of input modules 40, 41, 42 is particularly advantageous when the switches 56, 57, 58, 560, 61, 62, 63 comprises diodes according to the embodiment illustrated on FIG. 10.

As the switches are made from diodes, the control unit 11 cannot control the commutation of the switches to limit the rejections on the grid G, only the output modules contribute to reduce the rejections in the grid G.

FIG. 13 illustrates a second example of the arc furnace facility.

The arc furnace facility differs from the arc furnace facility illustrated on FIG. 1 in that the arc furnace facility comprises a direct voltage arc furnace 155.

The direct voltage arc furnace 155 comprises the set of electrodes comprising only one electrode 155*a*.

To supply the direct voltage arc furnace 155, the power supply system 1 further comprises a rectifier 156.

The rectifier 156 comprises a plurality of inputs 157, 158, 159, each input 157, 158, 159 being connected to a different phase 25, 26, 27 of the secondary circuit of the transformer 10.

The rectifier 156 further comprises a first output 160 connected to an enclosure 155*b* of the arc furnace 155 and a second output 161 connected to the electrode 155*a* of the arc furnace 155.

The rectifier 156 comprises the same number of identical legs 162, 163, 164 as the number of phases of the secondary circuit of the transformer 10, each leg 162, 163, 164 being connected to a different phase.

Each leg 162, 163, 164 comprises a first connection 162*a*, 163*a*, 164*a*, a second connection 162*b*, 163*b*, 164*b*, and a third connection 162*c*, 163*c*, 164*c*.

The first connection 162*a*, 163*a*, 164*a* of each leg 162, 163, 164 is connected to the first output 160 of the rectifier 156, the second connection 162*b*, 163*b*, 164*b* of each leg 162, 163, 164 is connected to the second output 161 of the rectifier 156, and the third connection 162*c*, 163*c*, 164*c* is connected to a different input 157, 158, 159 of the rectifier 156.

As the legs 162, 163, 164 are identical, only a first leg 162 is detailed.

The first leg 162 comprises two identical power diodes 165, 166 connected in series.

The cathode of a first power diode 165 is connected to the first connection 162*a*, the anode of the first power diode 165 and the cathode of the second power diode 166 are connected to the third connection 162*c*, and the anode of the second power diode 166 is connected to the second connection 162*b*.

The rectifier 156 rectifies the voltage delivered by each phase of the secondary circuit to supply the electrode 155*a* of the direct voltage arc furnace 155.

In variant, the rectifier 156 may comprise an active rectifier made from controlled semiconductor, for example transistors and/or gate turn off thyristors.

A first example of a method implementing the power supply system 1 is presented.

It is assumed that the first disconnecting means are open so that the first disconnector 13 and the third disconnector 15 are open and the second disconnecting means are closed so that the second disconnector 14 is closed.

As first disconnecting means are open, no current flows from through the first and third disconnectors 13, 15.

As second disconnecting means are closed, currents flow from the outputs 19, 20, 21 of the power converter 9 to the primary circuit of the transformer 10.

The control circuit 11 controls the input modules 40, 41, 42 and the outputs modules 48, 49, 50 to supply the set of electrodes and to stabilize the current and the voltage delivered by the grid G to reduce reactions in the grid G generated by the arc furnace 2, 155.

The control circuit 11 controls independently each switching unit 77 and each second switching unit 116, and if applicable each switch 60, 61, 62, 63 and each second switch 100, 101, 102, 103 to supply the set of electrodes and to stabilize the current and the voltage delivered by the grid G to reduce reactions in the grid G.

In another example of the method implementing the power supply system 1, the control circuit 11 closes the first disconnecting means so that currents flow from the grid G to the primary circuit through the first disconnector 13 and opens the second disconnecting means so that no current flows from the outputs of the power converter 9 to the primary circuit.

The arc furnace 2, 155 is directly supplied by the grid G through the first disconnector 13.

The control circuit 11 may further controls independently each switching unit 77 and each second switching unit 116, and if applicable each switch 60, 61, 62, 63 and each second switch 100, 101, 102, 103 to stabilize the current and the voltage delivered by the grid G to reduce reactions in the grid G.

The power converter 9 acts as a static compensator STATCOM to reduce the reactions on the grid G.

If applicable, the control circuit 11 closes the third disconnector 15 to inject power in the grid G.

If the power converter 9 is defective the first and second disconnecting means and the control circuit 11 allow to continue to implement the arc furnace 2, 155.

The invention claimed is:

1. A power supply system for arc furnace, the power supply system comprising:
   a power converter comprising an input connected to a polyphase supply grid and an output, and
   a polyphase transformer comprising a primary circuit and a secondary circuit connected to at least one electrode of the arc furnace,
   wherein the power supply system further comprises first disconnecting means connecting the input of the power converter to the primary circuit, second disconnecting means connecting the output of the power converter to the primary circuit, and the power supply system further comprises a control circuit configured:
      to control the power converter to supply the electrode and to stabilize the current and the voltage delivered by the polyphase supply grid to reduce reactions in the polyphase supply grid wen the first disconnecting means are open and the second disconnecting means are closed, and
      to control the power converter to stabilize the current and the voltage delivered by the polyphase supply grid to reduce reactions in the polyphase supply grid when the first disconnecting means are closed and the second disconnecting means are open.

2. The power supply system of claim 1, wherein the first disconnecting means further connect the input of the power converter to the output of the power converter, the control circuit being further configured to control the power converter to supply the polyphase supply grid with power when the first disconnecting means are closed.

3. The power supply system of claim 1, wherein the control circuit is further configured to close the first disconnecting means and to open the second disconnecting means.

4. The power supply system of claim 1, wherein the power converter comprises an input device, a link circuit comprising a first bus and a second bus, and an output device, wherein:
   the input device comprises a plurality of input modules, each input module being connected to the first bus and the second bus and being connected to a different phase of the polyphase supply grid to supply the link circuit with a continuous voltage from the said phase of the polyphase supply grid,
   the output device comprises a plurality of output modules, each output module being connected to the first bus and second bus and to the primary circuit to supply the transformer with an alternative voltage from the circuit link,
   each input module comprising:
   a leg including:
      a first string connected to the first and second bus and comprising a plurality of switches connected in series, a first connecting node situated between two switches, a second connecting node situated between two switches and a third connecting nodes situated between two switches, and
      a second string comprising:
   a first mid-connecting node,
   a plurality of switching units connected in series and extending between the first and second connecting points,
   the first mid-connecting node being between two switching units so that the number of switching units between the first connecting point and the first mid-connecting node is equal to the number of switching units between the second connecting point and the first mid-connecting node,
   the first mid-connecting node being connected to the said phase of the polyphase supply grid,
   the third connecting node of each input module being connected together,
   the control circuit being configured to control the switches, the switching units, and the output modules.

5. The power supply system of claim 4, wherein the leg further comprises two compensating modules, each compensating module comprising a first end and a plurality of switching units connected in series, the switching units of the first compensating module extending between the first connecting node and the first end of the first compensating unit, the switching units of the second compensating module extending between the second connecting node and the first end of the second compensating module, the first ends of the first and second compensating units being connected together, the control circuit being further configured to control the switching units of the compensating modules.

6. The power supply system of claim 1, wherein the power converter comprises an input device, a link circuit comprising a first bus and a second bus, and an output device, wherein:
   the input device comprises a plurality of input modules, each input module being connected to the first bus and the second bus and being connected to a different phase of the polyphase supply grid to supply the link circuit with a continuous voltage from the said phase of the polyphase supply grid, the output device is connected to the first bus and second bus and to the primary circuit to supply the transformer with an alternative voltage from the circuit link, each input module comprises a third string comprising:

a second mid-connecting node, and a plurality of switching units connected in series and extending between the first and second bus, the second mid-connecting node being between two second switching units so that the number of second switching units between the first bus and the second mid-connecting node is equal to the number of switching units between the second bus and the second mid-connecting node, the second mid-connecting node being connected to a phase of the primary circuit.

7. The power supply system of claim 4, wherein each output module comprises:

a second leg comprising:

a fourth string connected to the first and second bus and comprising a plurality of second switches connected in series and a fourth connecting node situated between two second switches, a fifth connecting node situated between two second switches, and a sixth connecting node situated between two second switches, and a fifth string comprising:

a third mid-connecting node, a plurality of second switching units connected in series and extending between the fourth and the fifth connecting nodes, the third mid-connecting node being between two switching units so that the number of switching units between the first connecting point and the third mid-connecting node is equal to the number of switching units between the second connecting point and the third mid-connecting node, the third mid-connecting node being connected to a phase of the primary circuit, the sixth connecting node of each output module being connected together, the control circuit being further configured to control the second switches and the second switching units.

8. The power supply system of claim 4, wherein each output module comprises a sixth string comprising:

a fourth mid-connecting node, and a plurality of second switching units connected in series and extending between the first and second bus, the fourth mid-connecting node being between two second switching units so that the number of second switching units between the first bus and the fourth mid-connecting node is equal to the number of switching units between the second bus and the fourth mid-connecting node, the fourth mid-connecting node being connected to a phase of the primary circuit.

9. An arc furnace facility, comprising, an arc furnace including at least one electrode and a power supply system according to claim 1, wherein the electrode is connected to at least one phase of the secondary circuit of the polyphase transformer.

10. The arc furnace facility of claim 9, wherein the arc furnace comprises a plurality of electrodes, each electrode being connected to a different phase of the secondary circuit.

11. The arc furnace facility of claim 9, wherein the power supply system further comprises a rectifier connected to the electrode and to each phase of the secondary circuit to supply the electrode with a continuous voltage from the secondary circuit.

12. A method for controlling a power supply system of an arc furnace, the power supply system comprising a power converter comprising an input connected to a polyphase supply grid and an output, and a polyphase transformer comprising a primary circuit and a secondary circuit connected to at least one electrode of the arc furnace, characterized in that the method comprises:

controlling the power converter to supply the electrode and to stabilize the current and the voltage delivered by the polyphase supply grid to reduce reactions in the polyphase supply grid when first disconnecting means are open and second disconnecting means are closed, and controlling the power converter to stabilize the current and the voltage delivered by the polyphase supply grid to reduce reactions in the polyphase supply grid when the first disconnecting means are closed and the second disconnecting means are open, the first disconnecting means connecting the input of the power converter to the primary circuit and the second disconnecting means connecting the output of the power converter to the primary circuit.

13. The method of claim 12, the first disconnecting means further connect the input of the power converter to the output of the power converter, the method further comprising controlling the power converter to supply the polyphase supply grid with power when the first disconnecting means are closed.

* * * * *